United States Patent Office 3,271,412
Patented Sept. 6, 1966

3,271,412
COUMARINE COMPOUNDS HAVING TRIAZOLE SUBSTITUENTS
Roderich Raue, Leverkusen, and Heinrich Gold, Cologne-Stammheim, Germany, assignors to Farbenfabriken Bayer Aktiengesellschaft, Leverkusen, Germany, a corporation of Germany
No Drawing. Filed Aug. 7, 1962, Ser. No. 215,294
Claims priority, application Germany, Aug. 19, 1961, F 34,735
7 Claims. (Cl. 260—308)

The present invention relates to coumarine compounds; more especially it concerns fluorescing, practically colourless coumarine compounds of the general formula

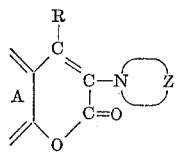

(I)

wherein R represents hydrogen or a lower alkyl group, A stands for the residue of an aromatic ring system and Z for the residue of a 5- or 6-membered heterocyclic ring system.

The aromatic rings in the coumarine compounds of the Formula I given above can also contain substituents with the exception of nitro groups, for example, alkyl, aralkyl or aryl groups, hydroxy, alkoxy, aralkoxy, or aryloxy groups, acyloxy or carbamyloxy groups, the groups —NHCO-alkyl, —NHCO-aryl, —NHCONH-alkyl
—NHCONH-aryl a carbalkoxy group, cyan, halogen as well as carbonamide or sulfonamide groups, which can be substituted by alkyl, aralkyl or aryl radicals, furthermore acid groups, such as the sulfonic acid group or the carboxylic acid group, or basic groups, such as amino groups or quaternary ammonium groups. The heterocyclic ring system attached to the coumarine ring system in the 3-position can likewise contain substituents, such as alkoxyalkyl groups; a quaternary ammonium group can also form part of the heterocyclic ring system.

In particular the invention concerns fluorescing, practically colourless coumarine compounds of the formulae

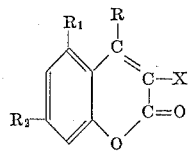

(II)

and

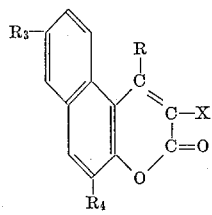

(III)

wherein R stands for hydrogen or a lower alkyl group, $R_1$ and $R_2$ represent independently the hydroxyl group, a lower alkoxy group, an acyloxy group, the amino group or a NH-acyl group wherein $R_1$ may also be hydrogen, and $R_3$ and $R_4$ stand independently for hydrogen, a lower alkoxy group or a lower carbalkoxy group, whereas X represents the group

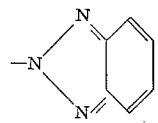

the group

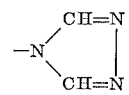

or the group

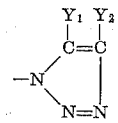

wherein $Y_1$ and $Y_2$ stand either independently of each other for hydrogen or a lower alkoxy alkyl group or together for the group —$CH_2.CH_2.CH_2.CH_2$— or the group —CH=CH—CH=CH—. Furthermore the invention concerns the quaternization products of the coumarine compounds of the Formulae II and III.

The coumarine compounds of the Formulae I, II and III are obtainable in various ways, for example by reacting an aromatic aldehyde carrying a hydroxyl group in ortho position or its substitution products, with 5- or 6-membered heterocyclic compounds, which contain at least one nitrogen atom in the ring and carry the radical of acetic acid or its functional derivatives on a nitrogen atom present in the ring.

Examples of suitable aromatic aldehydes are 2-hydroxy-benzaldehyde, 2-hydroxy-5-chloro-benzaldehyde, 2-hydroxy-3,5-dichloro-benzaldehyde, 2 - hydroxy - 5 - methyl-benzaldehyde, 2-hydroxy-5-tert.butyl-benzaldehyde, 2-hydroxy-3-methoxy-benzaldehyde, 2-hydroxy-3,5-dimethoxy-benzaldehyde, 2,4-dihydroxy-benzaldehyde, 2-hydroxy-4-methoxy-benzaldehyde, 2-methoxy-4-acetylamino-benzaldehyde, 2-hydroxy-1-naphthaldehyde, 2-hydroxy-3-carbethoxy-1-naphthaldehyde, 2-hydroxy-3-methoxy-1-naphthaldehyde and 2-hydroxy-6-methoxy-1-naphthaldeyde.

Suitable heterocyclic compounds which contain at least one nitrogen atom in the ring and carry the radical of acetic acid or its functional derivatives on a nitrogen atom present in the ring, are inter alia: pyrryl-1-acetic acid, imidazolyl-1-acetic acid, pyrazolyl-1-acetic acid, 1,2,3-triazolyl-1-acetic acid, 1,3,4-triazolyl-1-acetic acid, 1,2,3,4-tetrazolyl-1-acetic acid, indolyl-1-acetic acid indazolyl-1-acetic acid, benzimidazolyl-1-acetic acid, benzotriazolyl-1-acetic acid, benzotriazolyl-2-acetic acid, carbazolyl-9-acetic acid and the methyl-, ethyl-, propyl- or butyl esters of these acids, furthermore 1,2,3-triazolyl-1-acetonitrile, 4 - methoxymethyl - 1,2,3 - triazolyl-1-acetonitrile, 4,5 - tetramethylene - 1,2,3-triazolyl-1-acetonitrile and piperidyl acetonitrile.

The quaternization products of the coumarine compounds of the Formulae II and III are obtainable by reacting these coumarine compounds with alkylating agents, for instance with dimethyl sulfate, diethyl sulfate, methyl iodide, ethyl iodide, isopropyl iodide, butyl bromide, benzyl chloride or 4-toluene-sulfonic acid methyl- or ethyl-ester.

Coumarine compounds of the Formulae I, II or III containing sulfonic acid groups can be prepared by starting from appropriate components, which already contain sulfonic acid groups; it is also possible to treat coumarine compounds which contain no sulfonic acid groups, with a sulfonating agent, for example with sulfuric acid monohydrate, oleum, or chlorosulfonic acid; coumarine compounds having a sulfonic acid group linked to an aliphatic radical can be obtained by reacting a coumarine compound which contains a hydroxyl or amino group, with a sultone, for example with butane sultone.

According to a further feature of the present invention the coumarine compounds of the Formulae I, II and III can be used as optical brightening agents, in particular the compounds of these formulae when R is hydrogen. Coumarine compounds which contain an acid group, especially a sulfonic acid group, are primarily suitable for the brightening of natural fibre materials, e.g. wool, while coumarine compounds which contain basic groups, e.g. amino groups or quaternary ammonium groups, are suitable for the brightening of materials of polyacrylonitrile or cellulose esters. Coumarine compounds which contain neither acid nor basic groups and are consequently difficulty soluble in water, may be employed for the brightening of materials of synthetic polycondensates such as polyesters, polyamides and polyurethanes, as well as for the brightening of materials of polyacrylonitrile, polystyrene, or cellulose esters.

Especially good results are achieved with such coumarine compounds which possess an alkoxy group in the 7-position of the coumarine ring system. As brightening agents for polyacrylonitrile materials coumarine compounds of the Formulae II and III have proved very valuable wherein a quaternary ammonium group forms part of the heterocyclic ring system.

The coumarine compounds of the present invention can be applied as optical brightening agents in conventional manner, for example in the form of solutions in water or organic solvents or in the form of aqueous dispersions, condensation products of naphthalene sulfonic acids and formaldehyde being usable inter alia as dispersing agents. Polyester materials can also be treated with the brightening agents by saturating the materials with solutions or dispersions of the brightening agents, then squeezing off, drying and heating for a short time to temperatures above 100° C. The brightening agents may also be used together with detergents. They can furthermore be added to spinning and casting compositions for the production of synthetic fibres, threads and foils.

The coumarine compounds of the present invention are very effective brightening agents. They are also very stable to light and against bleaching baths containing chlorites. These advantageous properties are not possessed to the same extent by the coumarine compounds having a heterocyclic radical in 3-position what have hitherto been proposed as brightening agents.

The following examples serve to illustrate the invention without, however, limiting its scope, the parts given are parts by weight.

EXAMPLE 1

3-(1')-triazolyl-(1',2',3')-7-methoxy-coumarine

Into a mixture of 13.2 parts of the sodium salt of 1,2,3-triazolyl-1-acetic acid and 45 parts of acetic acid anhydride, 9.9 parts of 2-hydroxy-4-methoxybenzaldehyde are introduced. The reaction mixture is heated to the boil within half an hour, then boiled under reflux for 3 hours, cooled somewhat and finally added to 500 parts of water. The precipitate is filtered off with suction after several hours stirring, washed neutral and dried. The coumarine compound formed is purified first by rubbing with methanol and then by recrystallizing from a mixture of ethanol and acetonitrile. It melts at 198–202° C.

This coumarine compound can also be prepared by one of the following methods:

(a) 15.2 parts of 2-hydroxy-4-methoxy benzaldehyde and 15.5 parts of the ethyl ester of 1,2,3-triazolyl-1-acetic acid or 14.1 parts of the methyl ester of 1,2,3-triazolyl-1-acetic acid are dissolved in 30 parts of ethanol with gentle warming and 3 parts of piperidine are then added to the solution. Thereupon, the reaction mixture is heated to the boil under reflux and held at this temperature for 23 hours. After cooling the reaction mixture, the crystalline coumarine compound is filtered off with suction; recrystallized from dioxane it melts at 198–199° C.

(b) 11.6 parts of 2-hydroxy-4-methoxy benzaldehyde and 8.2 parts of 1,2,3-triazolyl-1-acetonitrile are dissolved in 40 parts of ethanol at 40° C. and 2 parts of piperidine are then added to the solution. The reaction mixture is heated to the boil under reflux for 2 hours. Thereupon the crystalline precipitate formed is filtered off with suction after cooling the reaction mixture, and washed with ethanol. The methine compound formed which corresponds to the formula

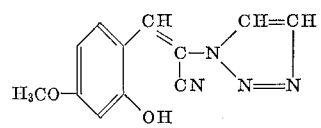

is heated to the boil under reflux for one hour with 100 parts of ethanol and 11 parts of concentrated hydrochloric acid. The reaction mixture is cooled and the coumarine compound formed is filtered off with suction. After recrystallization from dioxane it melts at 198–200° C.

(c) 19 parts of 3-(1')-triazolyl-(1',2',3')-7-hydroxy coumarine prepared according to Example 9 are heated to the boil for 10 minutes with 250 parts of ethanol. Into the suspension obtained 88 parts of 10% aqueous sodium carbonate solution are introduced dropwise and thereupon 16 parts of dimethyl sulfate are added. The reaction mixture is heated to the boil for one hour under reflux. Thereupon it is cooled and the separated crystals are filtered off with suction.

The crystals are washed neutral with water and freed from coloured impurities by washing with ice-cooled methanol. After recrystallization from a mixture of ethanol and acetonitrile the compound melts at 199 to 200° C.

Quaternization products of the above mentioned coumarine compound can be obtained in the following manner:

(1) A suspension of 12.2 parts of the coumarine compound in 100 parts of toluene is heated on the boiling water bath for 10 minutes. Thereupon 9.6 parts of dimethyl sulfate are dropped into the suspension and the reaction mixture is heated to the boil under reflux for 5 hours. The mixture is cooled with ice, whereupon the precipitated quaternization product is filtered off and dried in vacuo; after recrystallization from methanol it melts at 172–174° C.

By applying 11.6 parts of diethyl sulfate or 14 parts of 4-toluene sulfonic acid methyl ester instead of 9.6 parts of dimethyl sulfate, the corresponding quaternization products are obtained, melting at 148–151° C. and 141–142° C. respectively.

(2) 12.2 parts of the coumarine compound are heated with 30 parts of toluene and 10.7 parts of methyl iodide in a closed reaction vessel to 150–160° C. for about 6 hours. After cooling the reaction mixture, the quaternization product formed is filtered off and recrystallized from 250 parts of boiling water; it melts at 204–208° C. with decomposition.

By applying 11.8 parts of ethyl iodide, 10.8 parts of isopropyl iodide or 10.4 parts of n-butyl bromide instead of 10.7 parts of methyl iodide, the corresponding quaternization products are obtained, melting at 193–195° C. (after recrystallization from methanol), at 192–195° C. with decomposition (after recrystallization from methanol) and at 243–247° C. with decomposition (after recrystallization from a mixture of ethanol and water) respectively.

EXAMPLE 2

*3-(1')-triazolyl-(1',2',3')-5,7-dimethoxy-coumarine*

11.9 parts of 2-hydroxy-4,6-dimethoxy-benzaldehyde are introduced into a mixture of 13.2 parts of the sodium salt of 1,2,3-triazolyl-1-acetic acid and 45 parts of acetic acid anhydride. The reaction mixture is heated to the boil within half an hour, then boiled under reflux for 3 hours, cooled somewhat and finally added to 500 parts of water.

After several hours' stirring the precipitate is filtered off with suction, washed neutral and dried. The coumarine compound obtained is purified first by washing with methanol and then by recrystallizing from a mixture of alcohol and acetonitrile; it melts at 208 to 210° C.

EXAMPLE 3

*3-(1')-[4'-methoxymethyl-triazolyl-1',2',3']-7-methoxy-coumarine*

15.2 parts of 2-hydoxy-4-methoxy benzaldehyde and 15.2 parts of 4-methoxy methyl-1,2,3-triazolyl-1-acetonitrile are dissolved in 50 parts of heated ethanol whereupon 3 parts of piperidine are added dropwise to the solution. The reaction mixture is heated to the boil under reflux for 2 hours and cooled. The methine compound formed is filtered off and recrystallized from ethanol; it melts at 140–142° C.

7.7 parts of the methine compound are heated to the boil under reflux for one hour with 55 parts of ethanol and 5.5 parts of concentrated hydrochloric acid. Thereupon, the reaction mixture is cooled, the coumarine compound formed is filtered off with suction and washed first with water, then with diluted sodium carbonate solution and again with water. After recrystallization from ethanol the coumarine compound melts at 128–129° C.

A quaternization product of the coumarine compound can be obtained in the following manner: 5.4 parts of the coumarine compound are dissolved in 50 parts of toluene with heating to 80° C., whereupon 3.6 parts of dimethyl sulfate are introduced dropwise. The reaction mixture is heated to the boil under reflux for 3 hours and then cooled. After decanting the toluene the remainder is rubbed with acetone. The crystalline quaternization product is then filtered off with suction and recrystallized from ethanol; it melts at 133–136° C.

EXAMPLE 4

*3-(1')-[4',5'-dimethoxymethyl-triazolyl-1',2',3']-7-methoxy-coumarine*

30.4 parts of 2-hydroxy-4-methoxy benzaldehyde and 39.2 parts of 4.5 dimethoxymethyl-1,2,3-triazolyl-1-acetonitrile are dissolved in 50 parts of ethanol with warming and 5 parts of piperidine are added dropwise to the solution. The reaction mixture is heated to the boil under reflux for 3 hours, then cooled and mixed with 50 parts of water and 11 parts of concentrated hydrochloric acid. Thereupon water vapour is introduced into the mixture in order to eliminate non-reacted 2-hydroxy-4-methoxybenzaldehyde. The precipitate formed is washed with methanol and the coumarine compound is then recrystallized from methanol; it melts at 108–109° C.

By reacting the coumarine compound with dimethyl sulfate in the manner described in Example 3, the corresponding quaternization product is obtained which melts at 135° C. after recrystallization from acetone.

EXAMPLE 5

*3-(1')-benztriazolyl-(1',2',3')-7-methoxy-coumarine*

26.5 parts of the sodium salt of 1,2,3-benztriazolyl-1-acetic acid, 15.2 parts of 2-hydroxy-4-methoxy-benzaldehyde and 100 parts of acetic acid anhydride are slowly heated to the boil under reflux. After 6 hours the mixture is somewhat cooled and then added to 1000 parts of water with stirring. After further stirring for several hours, the precipitate is filtered off with suction and washed neutral. The coumarine compound formed is purified by washing with methanol and then recrystallized from dioxane; it melts at 231–232° C.

EXAMPLE 6

*3-(1')-benztriazolyl-(1',2',3')-5,7-dimethoxy-coumarine*

8.9 parts of the sodium salt of 1,2,3-benztriazolyl-1-acetic acid, 6.1 parts of 2-hydroxy-4,6-dimethoxy-benzaldehyde and 50 parts of acetic acid anhydride are slowly heated to the boil under reflux and held at this temperature for 5 hours. Thereupon the reaction mixture is somewhat cooled and then added to 500 parts of water.

After stirring the suspension for some hours at room temperature, the water is decanted and the remainder is washed by methanol. After recrystallization from ethanol, the coumarine compound melts at 238° C.

EXAMPLE 7

*3-(2')-benztriazolyl-(1',2',3')-7-methoxy-coumarine*

Into a mixture of 17.1 parts of the sodium salt of 1,2,3-benztriazolyl-2-acetic acid and 75 parts of acetic acid anhydride 9.8 parts of 2-hydroxy-4-methoxy-benzaldehyde are introduced. The reaction mixture is heated to the boil within half an hour and held at this temperature for 6 hours; thereupon, it is somewhat cooled and poured into 1000 parts of water. After stirring for several hours the crystalline precipitate formed is filtered off and washed neutral. The crystals are purified by washing with a mixture of ethanol and dioxane and then recrystallized from acetonitrile. The coumarine compound melts at 148–152° C.

EXAMPLE 8

*3-(1')-triazolyl-(1',2',3')-7-acetoxy-coumarine*

11.6 parts of 2,4-dihydroxy-benzaldehyde, 16.9 parts of the sodium salt of 1,2,3-triazolyl-1-acetic acid and 45 parts of acetic acid anhydride are slowly heated to the boil under reflux. After 4 hours the mixture is somewhat cooled and then added with stirring to 750 parts of ice-water. After several hours stirring, the precipitate formed is filtered off with suction and washed neutral. The coumarine compound formed is purified by washing with methanol and then recrystallized from dioxane. It melts at 200–203° C.

EXAMPLE 9

*3-(1')-triazolyl-(1',2',3')-7-hydroxy-coumarine*

10.6 parts of 3-(1')-triazolyl-(1',2',3')-7-acetoxy-coumarine obtained according to Example 8 are stirred with 150 parts of ethanol, the mixture is treated dropwise at 50° C. with 15 parts of a 10% aqueous sodium hydroxide solution and then heated to the boil under reflux for an hour. Thereupon the solution is poured into 750 parts of water, clarified with animal charcoal, then cooled and acidified with 15 parts of concentrated hydrochloric acid. The precipitate is filtered off with suction, washed neutral with water and dried. After recrystallizing from a mixture of dioxane and water the 3-(1')-triazolyl-(1',2',3')-7-hydroxy-coumarine melts at 296° C. with decomposition.

EXAMPLE 10

*3-(1')-triazolyl-(1',2',3')-7-amino-coumarine*

19.3 Parts of 2-methoxy-4-acetylamino-benzaldhyde and 10.8 parts 1,2,3-triazolyl-1-acetonitrile are dissolved in 50 parts of ethanol at 70° C. and 3 parts piperidine are added dropwise to the solution. Thereupon the reaction mixture is heated to the boil under reflux for two hours and the methine compound formed is filtered off; it melts at 265–268° C.

17.4 parts of the methine compound are then added to 150 parts of benzene, the suspension is mixed with 45.1 parts of anhydrous aluminium chloride, heated to the boil under reflux for 6 hours, cooled and mixed with ice-water. Thereupon the solvent is distilled off with water vapour. From the residue the coumarine compound formed is filtered off with suction; it melts at 266–268° C.

EXAMPLE 11

*1-(1')-triazolyl-(1',2',3')-7-acetylamino-coumarine*

17.1 parts of 3-(1')-triazolyl-(1',2',3')-7-amino-coumarine obtained according to Example 10 are dissolved in 70 parts of piperidine with heating and 8.8 parts of acetic acid anhydride are added dropwise to the solution. Thereupon the reaction mixture is heated on the boiling water bath for 1 hour and then poured into 1000 parts of water. After the suspension formed has been stirred at room temperature for about 12 hours, the 3-(1')-triazolyl-(1',2',3')-7-acetylamino-coumarine is filtered off with suction and washed neutral with water. After recrystallization from dimethyl formamide it melts at 273–275° C.

EXAMPLE 12

*3-(1')-triazolyl-(1',3',4')-7-methoxy-coumarine*

26.4 parts of the sodium salt of 1,3,4-triazolyl-1-acetic acid and 19.8 parts of 2-hydroxy-4-methoxy-benzaldehyde are added to 90 parts of acetic acid anhydride. The reaction mixture is heated to the boil within ½ hour and held at boiling temperature under reflux for 5½ hours. Thereupon the reaction mixture is somewhat cooled and poured into 1000 parts of water. After stirring the suspension formed for about 12 hours at room temperature the coumarin compound is filtered off with suction, washed with cooled methanol and recrystallized from dioxane; it melts at 205–207° C.

A quaternization product of the coumarin compound can be prepared in the following manner: 7.7 parts of the coumarine compound are heated for 10 minutes with 80 parts of toluene on the boiling water bath and then mixed with 6 parts of dimethyl sulfate. After stirring the reaction mixture for 3 hours on the boiling water bath, it is cooled and the quaternization product is filtered off with suction; it melts at 187–191° C. after recrystallization from ethanol.

EXAMPLE 13

*3-(1')triazolyl-(1',2',3')-5,6-benzocoumarine*

Into a mixture of 23.6 parts of the sodium salt of 1,2,3-triazolyl-1-acetic acid and 60 parts of acetic acid anhydride, there are introduced 20 parts of 2-hydroxy-1-naphthaldehyde. The reaction mixture is heated to boiling within half an hour, held for 6 hours at this temperature, then somewhat cooled and finally added to 1000 parts of water. The coumarine compound formed is filtered off with suction after several hours stirring, and washed neutral. It is then washed with hot ethanol and recrystallized from a mixture of dioxane and dimethyl formamide; it melts at 254–256° C.

EXAMPLE 14

*3-(1')-[4',5'-tetramethylene-triazolyl-(1',2',3')]-5,6-benzocoumarine*

17.2 parts of 2-hydroxy-1-naphthaldehyde and 16.2 parts of 4,5-tetramethylene-1,2,3-triazolyl-1-acetonitrile are dissolved in 60 parts of ethanol at 60° C. 3 parts of piperidine are then dropped into the solution and the reaction mixture is heated to the boil under reflux for 3 hours, whereupon it is cooled. The methine compound formed is filtered off; it melts at 196–198° C.

24.2 parts of the methine compound are heated to the boil with 200 parts of ethanol and 20 parts of concentrated hydrochloric acid. The reaction mixture is kept at boiling temperature for 1 hour and then cooled. The coumarin compound formed is filtered off, after recrystallization from dioxane it melts at 233–235° C.

EXAMPLE 15

*3-(1')-benztriazolyl-(1',2',3')-5,6-benzocoumarine*

Into a mixture of 13.3 parts of the sodium salt of 1,2,3-benztriazolyl-1-acetic acid and 50 parts acetic acid anhydride, there are introduced 8.6 parts of 2-hydroxy-1-naphthaldehyde. The reaction mixture is heated to the boil within half an hour and held at this temperature for 5 hours, after which it is cooled somewhat, then added to 800 parts of water and stirred for a few hours more. The coumarine compound formed is filtered off with suction and washed neutral. It is then washed with methanol and recrystallized from dimethyl formamide; it melts at 296–297° C.

EXAMPLE 16

*3-(1')-triazolyl-(1',3',4')-5,6-benzocoumarine*

26.4 parts of the sodium salt of 1,3,4-triazolylacetic acid and 22.4 parts of 2-hydroxy-1-naphthaldehyde are introduced into 90 parts of acetic acid anhydride. The reaction mixture is then heated to the boil within half an hour and held at this temperature for 4 hours under reflux, after which it is cooled somewhat, then added to 1000 parts of water. After stirring the mixture for 3 hours at room temperature the coumarine compound formed is filtered off with suction and recrystallized from dioxane; it melts at 231–232° C.

A quaternization product of the coumarine compound can be obtained in the following manner: 10.7 parts of the coumarine compound are heated on the boiling water bath with 100 parts of toluene for 10 minutes whereupon 7.8 parts of dimethyl sulfate are added to the suspension. The reaction mixture is stirred for 3 hours on the boiling water bath and then cooled. The quaternization product is filtered off and recrystallized from water; it melts at 231° C. with decomposition.

EXAMPLE 17

*3-(1')-triazolyl-(1',3',4')-8-carbethoxy-5,6-benzo-coumarine*

13.4 parts of the sodium salt of 1,3,4-triazolyl-1-acetic acid and 16.1 parts of 2-hydroxy-3-carbethoxy-1-naphthaldehyde are introduced into 45 parts of acetic acid anhydride. The reaction mixture is heated to the boil under reflux for 4 hours, then somewhat cooled and poured into 500 parts of water. The suspension is stirred for about 12 hours at room temperature and the coumarine compound formed is filtered off with suction. After recrystallization from dioxane it melts at 223–225° C.

A quaternization product of the coumarine compound can be obtained in the following manner: 5.8 parts of the coumarine compound are heated on the boiling water bath with 45 parts of toluene for 10 minutes whereupon 3.4 parts of dimethyl sulfate are introduced dropwise into the suspension. The reaction mixture is stirred for 3 hours on the boiling water bath and then cooled. The quaternization product is filtered off and recrystallized from a mixture of equal parts of water and ethanol; it melts at 252–253° C. with decomposition.

EXAMPLE 18

*3-(1')-[4',5'-tetramethylene-triazolyl-(1',2',3')]-7-methoxy-coumarine*

15.2 parts of 2-hydroxy-4-methoxy-benzaldehyde and 16.2 parts of 4,5-tetramethylene-1,2,3-triazolyl-1-acetonitrile are dissolved in 60 parts of ethanol at 45° C. 3 parts of piperidine are dropped into the solution and the reaction mixture is heated to the boil under reflux for 3 hours, whereupon it is somewhat cooled. 100 parts of water and 10 parts of concentrated hydrochloric acid are then added and the reaction mixture is treated with water vapour in order to eliminate non-reacted 2-hydroxy-4-methoxy-benzaldehyde. After cooling the suspension the precipitated coumarine compound formed is filtered off with suction, purified by washing with methanol and recrystallized from dioxane; it melts at 184–186° C. A suspension of 12.2 parts of the coumarine compound in 100 parts of toluene is heated to the boil under reflux for 10 minutes. Thereupon 3.4 parts of dimethyl sulfate are dropped into the suspension and the reaction mixture is heated to the boil under reflux for 3 hours. After cooling the reaction mixture the toluene is decanted and the remainder is washed with methanol. The crystalline quaternization product formed is filtered off with suction and washed with acetone; it melts at 107–120° C. and can be further purified by recrystallization from n-butanol.

EXAMPLE 19

*Sulfonated 3-(1')-triazolyl-(1',2',3')-7-methoxy-courmarine*

24.3 parts of 3-(1')-triazolyl-(1',2',3')-7-methoxy-coumarine are introduced into 120 parts of sulfuric acid monohydrate within 30 minutes whereupon the mixture is stirred for 10 hours. 10 parts of oleum with a sulfur dioxide content of 65% are then added to the reaction mixture and a further 10 parts of oleum are added after 2 hours. The mixture is stirred for another 2 hours at room temperature and then poured onto 600 parts of ice. After stirring for several hours the precipitated sulfonation product is filtered off with suction and washed with ice-water.

EXAMPLE 20

Polyester fibres produced from terephthalic acid and glycol are treated at a liquor to goods ratio of 40:1 in a bath which contains per litre 1 g. of oleyl alcohol sulfonate, 0.75 g. formic acid and 0.07 g. of the coumarine compound described in Example 1, as brightening agent. The bath is then heated to the boil and held at this temperature for 30–60 minutes. After rinsing and drying the polyester fibres show an outstanding brightening.

A very good brightening can also be obtained, if the bath contains per litre 0.07 g. of the coumarine compound described in Example 2, 0.125 g. of the coumarine compound described in Example 7, 0.125 g. of the coumarine compound described in Example 12 or 0.07 g. of the coumarine compound described in Example 13 instead of 0.07 g. of the coumarine compound described in Example 1.

EXAMPLE 21

Cellulose acetate fibres are treated at a liquor to goods ratio of 30:1 at 30–70° C. for 20–30 minutes in an aqueous bath which contains per litre 1 g. of oleyl alcohol sulfonate and 0.06 g. of the coumarine compound described in Example 3, as brightening agent. The cellulose acetate fibres are then rinsed and dried; they show an outstanding brightening.

If the bath contains per litre 0.07 g. of the coumarine compound described in Example 6, 0.03 g. of the coumarine compound described in Example 13, 0.06 g. of the coumarine compound described in Example 14, 0.03 g. of the coumarine compound described in Example 15, 0.07 g. of the coumarine compound described in Example 17 or 0.07 g. of the quaternization product obtained by the action of dimethyl sulfate on the coumarine compound described in Example 16, instead of 0.06 g. of the coumarine compound described in Example 3, the brightening obtained is likewise very good.

EXAMPLE 22

Polyacrylonitrile fibres are introduced into an aqueous bath at a liquor to goods ratio of 40:1, the bath containing per litre 1 g. of a surface active paraffin sulfonate, 0.75 g. of formic acid and 0.07 g. of the coumarine compound described in Example 2, as brightening agent. The bath is then heated to the boil within 20–30 minutes and held at this temperature for 30–60 minutes. Thereupon the fibres are rinsed and dried. They are then very well brightened.

If the bath contains per litre 0.1 g. of the coumarine compound described in Example 5 or 0.1 g. of the coumarine compound described in Example 9 instead of 0.07 g. of the coumarine compound described in Example 2, the brightening obtained is also very good.

EXAMPLE 23

Polyacrylonitrile fibres are brought into an aqueous bath at a liquor to goods ratio of 40:1, the bath containing per litre 1 g. of oxalic acid, 1 g. of sodium chlorite, and 0.1 g. of the quaternization product obtained by the action of dimethylsulfate on the coumarine compound described in Example 1, as brightening agent. The bath is heated to the boil within 20 minutes and held at this temperature for 45–60 minutes. The polyacrylonitrile fibres are then rinsed and dried. After this treatment the fibres are brightened in outstanding manner.

A very good brightening can also be obtained if the bath contains per litre instead of 0.1 g. of the above mentioned quaternization product 0.1 g. of one of the quaternization products described in Examples 1, 3, 4, 12, 17 and 18 or the quaternization product which can be obtained by the action of dimethyl sulfate on the coumarine compound of Example 14 and melts at 226–234° C. with decomposition.

EXAMPLE 24

From 10 parts polyacrylonitrile, 80 parts of dimethyl formamide and 10 parts of the coumarine compound described in Example 1, as brightening agent, a stock solution is produced. A conventional polyacrylonitrile spinning solution is added in amounts such that the concentration of the brightening agent in the spun polyacrylonitrile materials amounts to 0.25 percent by weight. The spinning solution is then spun in the usual way and the fibrous material so formed is bleached in a bath containing sodium chlorite. The brightening effect obtained is outstanding.

EXAMPLE 25

Polyamide fibres from ε-caprolactam are treated at a liquor to goods ratio of 30:1 at 30 to 70° C. for 20 to 30 minutes in a bath containing per litre 1 g. of oleyl alcohol sulfonate and 0.03 g. of the coumarine described in Example 11, as brightening agent. After rinsing and drying the treated polyamide fibres show a very good brightening.

When the bath contains per litre 0.03 g. of the coumarine compound described in Example 13 or 0.17 g. of the coumarine compound described in Example 16, instead of 0.03 g. of the coumarine compound described in Example 11 the brightening obtained is likewise very good. If desired 0.75 g. acetic acid can be added per litre of the treating bath.

EXAMPLE 26

A wool fabric is treated at a liquor to goods ratio of 40:1 at 60° C. for 30 minutes in a bath containing per litre 0.75 g. formic acid and 0.13 g. of the coumarine compound described in Example 10, as brightening agent. The fabric is then rinsed and dried. It shows a very good brightening.

If 0.13 g. of the sulfonated coumarine compound described in Example 19 is applied instead of the coumarine compound described in Example 10, a very good brightening is likewise obtained.

We claim:
1. A compound of the formula

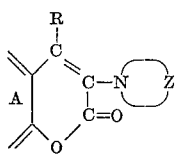

wherein R is a member selected from the group consisting of hydrogen and lower alkyl; A is a residue of an aromatic ring system selected from the group consisting of phenyl, chlorophenyl, dichlorophenyl, lower alkoxy phenyl, hydroxy-lower alkoxy phenyl, hydroxy phenyl, lower alkyl phenyl, di-lower-alkoxy phenyl, acetoxy phenyl, amino phenyl, sulfo-phenyl, acetylamino phenyl, naphthyl, hydroxy naphthyl, carbo-lower alkoxy naphthyl, hydroxy-lower alkoxy naphthyl;

is a 5–6 membered heterocyclic ring selected from the group consisting of

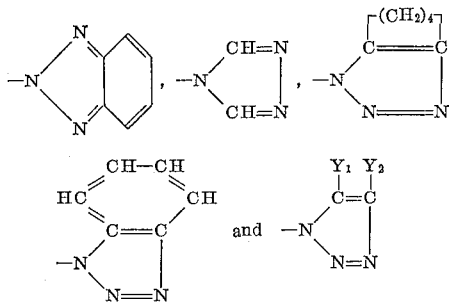

wherein $Y_1$ and $Y_2$ stand independently for a member selected from the group consisting of hydrogen and lower alkoxy alkyl; and the corresponding quaternization products effected with an alkylating agent selected from the group consisting of dimethyl sulfate, diethyl sulfate, methyl iodide, ethyl iodide, isopropyl iodide, butyl bromide, benzyl chloride, and 4-toluene-sulfonic acid methyl and ethyl esters.

2. 3-(1')-triazolyl-(1', 2', 3')-7-methoxy-coumarine.
3. 3-(1')-triazolyl-(1', 2', 3') - 5,7-dimethoxy-coumarine.
4. 3-(1')-[4'-methoxymethyl-triazolyl - 1', 2',3'] - 7-methoxy-coumarine.
5. 3-(1')-[4',5'-dimethoxymethyl-triazolyl-1', 2', 3']-7-methoxy-coumarine.
6. A compound of the formula

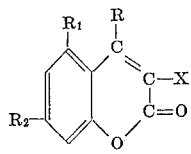

wherein R stands for a member selected from the group consisting of hydrogen and lower alkyl; $R_1$ and $R_2$ represent independently a member selected from the group consisting of hydrogen, hydroxyl, lower alkoxy, acyloxy, amino and NH-acyl; and X represents a member selected from the group consisting of

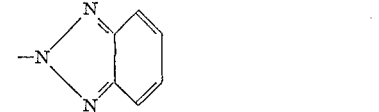

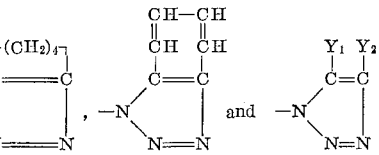

wherein $Y_1$ and $Y_2$ stand either independently of each other for a member selected from the group consisting of hydrogen and lower alkoxy alkyl.

7. A compound of the formula

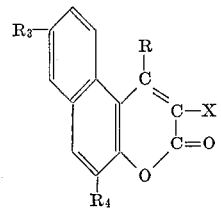

wherein R stands for a member selected from the group consisting of hydrogen and lower alkyl; $R_3$ and $R_4$ stand for a member selected from the group consisting of hydrogen, lower alkoxy and lower carbalkoxy; and X represents a member selected from the group consisting of

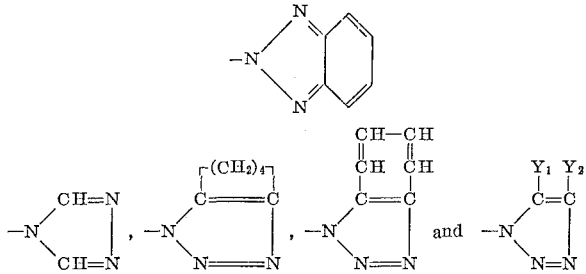

wherein $Y_1$ and $Y_2$ stand either independently of each other for a member selected from the group consisting of hydrogen and lower alkoxy alkyl.

References Cited by the Examiner
UNITED STATES PATENTS
2,334,348  11/1943  Miglarese _____ 260—308
3,014,041  12/1961  Hausermann et al. ___ 260—308

ALEX MAZEL, Primary Examiner.
NICHOLAS S. RIZZO, Examiner.
A. D. ROLLINS, Assistant Examiner.